(12) United States Patent
Miyazaki et al.

(10) Patent No.: US 7,230,219 B2
(45) Date of Patent: Jun. 12, 2007

(54) INVERTER POWER SOURCE CONTROL FOR HIGH FREQUENCY HEATER

(75) Inventors: Shinobu Miyazaki, Osaka (JP); Masaki Nakaishi, Osaka (JP); Shinichi Masuda, Tondabayashi (JP)

(73) Assignees: Tabuchi Electric Co., Ltd., Osaka (JP); Sharp Kabushiki Kaisha, Osaka (JP)

( * ) Notice: Subject to any disclaimer, the term of this patent is extended or adjusted under 35 U.S.C. 154(b) by 10 days.

(21) Appl. No.: 10/558,423

(22) PCT Filed: May 25, 2004

(86) PCT No.: PCT/JP2004/007095

§ 371 (c)(1),
(2), (4) Date: Nov. 29, 2005

(87) PCT Pub. No.: WO2004/107553

PCT Pub. Date: Dec. 9, 2004

(65) Prior Publication Data

US 2006/0289509 A1    Dec. 28, 2006

(30) Foreign Application Priority Data

May 30, 2003   (JP) ............................ 2003-155354

(51) Int. Cl.
*H05B 6/68* (2006.01)
*H02M 3/335* (2006.01)

(52) U.S. Cl. ...................... 219/715; 219/716; 219/702; 363/21.1

(58) Field of Classification Search ........ 219/715–718, 219/702, 704; 363/21.1, 21.11, 97–98
See application file for complete search history.

(56) References Cited

U.S. PATENT DOCUMENTS

| 4,900,885 A | * | 2/1990 | Inumada ...................... 219/716 |
| 5,124,518 A | * | 6/1992 | Lee ............................. 219/718 |
| 5,222,015 A | * | 6/1993 | Nakagawa ............... 363/21.04 |
| 5,354,972 A | * | 10/1994 | Han .......................... 219/715 |

FOREIGN PATENT DOCUMENTS

| JP | 4-359889 A | 12/1992 |
| JP | 6-215868 A | 8/1994 |
| JP | 2000-243548 A | 9/2000 |
| JP | 2002-56966 A | 2/2002 |

* cited by examiner

*Primary Examiner*—Philip H. Leung
(74) *Attorney, Agent, or Firm*—Birch, Stewart, Kolasch & Birch, LLP (57) ABSTRACT

An oscillation control signal generated by an inverter power source control circuit (12) includes a reference voltage setting signal for approximating the current waveform of the AC output form the AC power source (1) to a sinusoidal wave by making both sides of the waveform generate current according to the fluctuation of the PWM control signal, and a waveform shaping signal consisting of a peak adjustment signal of a sinusoidal waveform for approximating the waveform peak portion of the current waveform to a sinusoidal wave by subtraction. Accordingly, even if the PWM control signal fluctuates, it is possible to automatically improve the power factor of the power source circuit to a value higher than a predetermined value by approximating the current waveform of the AC output from the AC power source to the sinusoidal wave, thereby improving the efficiency of the power source.

7 Claims, 4 Drawing Sheets

INVERTER POWER SOURCE CONTROL FOR HIGH FREQUENCY HEATER

FIELD OF THE INVENTION

The present invention relates to an inverter power source control circuit for supplying an electric power to a magnetron employed in a high frequency heating apparatus such as, for example, a microwave oven.

BACKGROUND ART

In general, the inverter power source control circuit employed in a high frequency heating apparatus such as, for example, a microwave oven is so designed that an alternating current output from an alternating current power source is full-wave rectified to provide a direct current output on one hand and, in order to convert this direct current output to a desired alternating current output that is to be supplied to a magnetron employed in the microwave oven, an oscillation control signal based on a PWM control signal fed from a microcomputer used to control the microwave oven is applied through an inverter to a switching element such as an IGBT (Insulated Gate Bipolar Transistor) element See, for example, the Japanese Laid-open Patent Publication No. 2002-56966.

However, the magnetron employed in the microwave oven is generally known to have such a characteristic that no electric current flows therethrough unless an electric voltage of a value equal to or higher than a predetermined value is applied thereto. For this reason, the alternating current output from the alternating current power source represents such a distorted waveform as shown in FIG. 6B. Specifically, considering that the electric current abruptly starts flowing when the electric voltage attains a value equal to or higher than the predetermined value, but fails to flow when the voltage attains a value lower than the predetermined value, the distorted waveform of the alternating current output involves steep rise (ascent) and descent areas appearing on both sides of the waveform. Once this distorted waveform occurs in the alternating current output, the power factor of the electric power source circuit fails to increase. In addition, according to the state of the art, since no influence brought about on the power factor by fluctuation of the PWM control signal is virtually taken into consideration, a difficulty is keenly realized in increasing the efficiency of the electric power supply in a large range of load.

Also, when it comes to the microwave oven for household use, needs for the swift cooking capability and the safety factor are of primary concern and, therefore, the inverter power source control circuit employed in the microwave oven for household use is desired to have a high stability against and a high responsivity with change in output from the magnetron used therein.

DISCLOSURE OF THE INVENTION

In view of the foregoing, the present invention has been devised to substantially eliminate the problems and inconveniences discussed above and is intended to provide an improved inverter power source control circuit for a high frequency heating apparatus, wherein not only can the power factor of the power source circuit be automatically improved, but the responsivity and the stability can also be increased.

In order to accomplish the foregoing object, the present invention provides an inverter power source control circuit for a high frequency heating apparatus, which is provided in an inverter power source circuit for supplying an electric power to a magnetron of the high frequency heating apparatus and operable to generate an oscillation control signal by full wave rectifying and converting an alternating current output from an alternating current power source to a direct current output and applying the oscillation control signal, based on a PWM control signal through an inverter to a switching element to thereby convert the direct current output to a desired alternating current output. This inverter power source control circuit includes a control reference voltage setting circuit for outputting a reference voltage setting signal useable as a benchmark for generation of the oscillation control signal of a voltage set in correspondence with fluctuation of the PWM control signal, wherein by means of the oscillation control signal having the voltage so set, a current waveform of the alternating current output can be approximated to a sinusoidal wave by generating an electric current at both sides of the current waveform of the alternating current output; an input waveform adjusting circuit for adjusting a peak portion of an input waveform, applied to the inverter to generate a peak adjustment signal required to generate the oscillation control signal, to a sinusoidal wave, wherein by means of the oscillation control signal having this peak adjustment signal, the current waveform of the alternating current output can be approximated to the sinusoidal wave through subtraction of the peak portion of the waveform using the peak adjustment signal of the sinusoidal wave; and an oscillation control signal generating circuit for generating the oscillation control signal based on a waveform shaping signal, comprised of the reference voltage setting signal and the peak adjustment signal, and a triangular wave signal from an oscillator, wherein by means of the oscillation control signal containing the reference voltage setting signal and the peak adjustment signal, even though the PWM control signal fluctuates, the current waveform of the alternating current output from the alternating current power source can be approximated to a sinusoidal wave to thereby improve a power factor of an electric power source circuit.

According to the present invention, since the oscillation control signal generated by the inverter oscillation control circuit includes the reference voltage setting signal, that is used to approximate the current waveform of the alternating current output from the alternating current power source to the sinusoidal wave by generating an electric current in both sides of the current waveform in correspondence with the fluctuation of the PWM control signal, and the waveform shaping signal comprised of the peak adjusting signal of a sinusoidal waveform that is used to approximate to the sinusoidal wave by subtracting a peak portion of the current waveform, the power factor of the electric power source circuit can be automatically improved to a value higher than a predetermined value by approximating the current waveform of the alternating current output from the alternating current power source to the sinusoidal wave even though the PWM control signal fluctuates, therein resulting in increase of the efficiency of the electric power source.

Preferably the control reference voltage setting circuit may include a ripple generating circuit for generating a ripple in one of the PWM control signal or a detected and rectified signal, which is a detected signal outputted from a current transformer for detecting the alternating current output from the alternating current power source, a first voltage comparator for comparing the PWM control signal and the detected and rectified signal, either of which contains the ripple, with each other when the both are applied thereto, and an integrating circuit having a small time constant for smoothing an output from the first voltage comparator. Accordingly, when the PWM control signal and the detected and rectified signal of the alternating current output, one of which is generated with the ripple, is inputted to the first voltage comparator, a signal of a high frequency can be outputted from the first voltage comparator in the presence of the ripple, that is, comparison of the alternating current outputs is carried out by the first voltage comparator at a short cycle. Therefore, the responsivity with the fluctuation of the magnetron output can be increased. Also, the output from the first voltage comparator, when smoothed by the integrating circuit, stabilizes, selection of a relatively small time constant of the integrating circuit is effective to maintain the responsivity, and the responsivity and stability in correspondence with the fluctuation of the magnetron output can further be increased.

Also preferably, the inverter power source control circuit may further include an integrating circuit having a large time constant for smoothing the PWM control signal or an output of the detected and rectified signal, respectively. In this case, the ripple generating circuit is provided in either one of those integrating circuits. Accordingly, while the responsivity can be increased as a result of the generation of the ripple, the soft start can be realized since the integrating circuit has a large time constant.

In a preferred embodiment of the present invention, the input waveform adjusting circuit may include a resistor having a high resistance and a Zener diode connected in series with the resistor. In this case, by the utilization of a characteristic of the Zener diode when the electric current is lowered with the resistor having the high resistance, an input waveform of the full wave rectified output to be applied to the inverter is adjusted. Accordingly, the voltage obtained by dividing the voltage of the full wave rectified output with the resistor of a high resistance and the Zener diode can be cut by the Zener diode to a predetermined value consistent with the characteristic of the magnetron and, also, by the utilization of the characteristic of the Zener diode, in which when the electric current is reduced across the resistor of a high resistance a voltage exceeding the predetermined voltage is generated, a voltage portion in the vicinity of the voltage so cut out by the Zener diode is approximated to the sinusoidal wave. Hence, with the peak adjusted signal based thereon, the current waveform of the alternating current output can be approximated to the sinusoidal wave. Accordingly, with the use of a simple combination of the resistor of a high resistance and the Zener diode, the input waveform adjusting circuit can be realized at a reduced cost.

In another preferred embodiment of the present invention, the oscillation control generating circuit may include a second voltage comparator and a third voltage comparator, each forming a differential amplifier. In this case, when a signal having the adjusted input waveform from the inverter and an output from the third voltage comparator are fed to the second voltage comparator, the second voltage comparator outputs the peak adjustment signal and, also, when the reference voltage setting signal from the control reference voltage setting circuit and the peak adjustment signal from the second voltage comparator are fed to the third voltage comparator, the third voltage comparator outputs the waveform shaping signal comprised of the reference voltage setting signal and the peak adjustment signal. Accordingly, with a simplified construction, the oscillation control signal required to approximate the current waveform of the alternating current output from the alternating current power source to the sinusoidal wave can be generated.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

Hereinafter, a preferred embodiment of the present invention will be described in detail with reference to the accompanying drawings.

Figure 1:
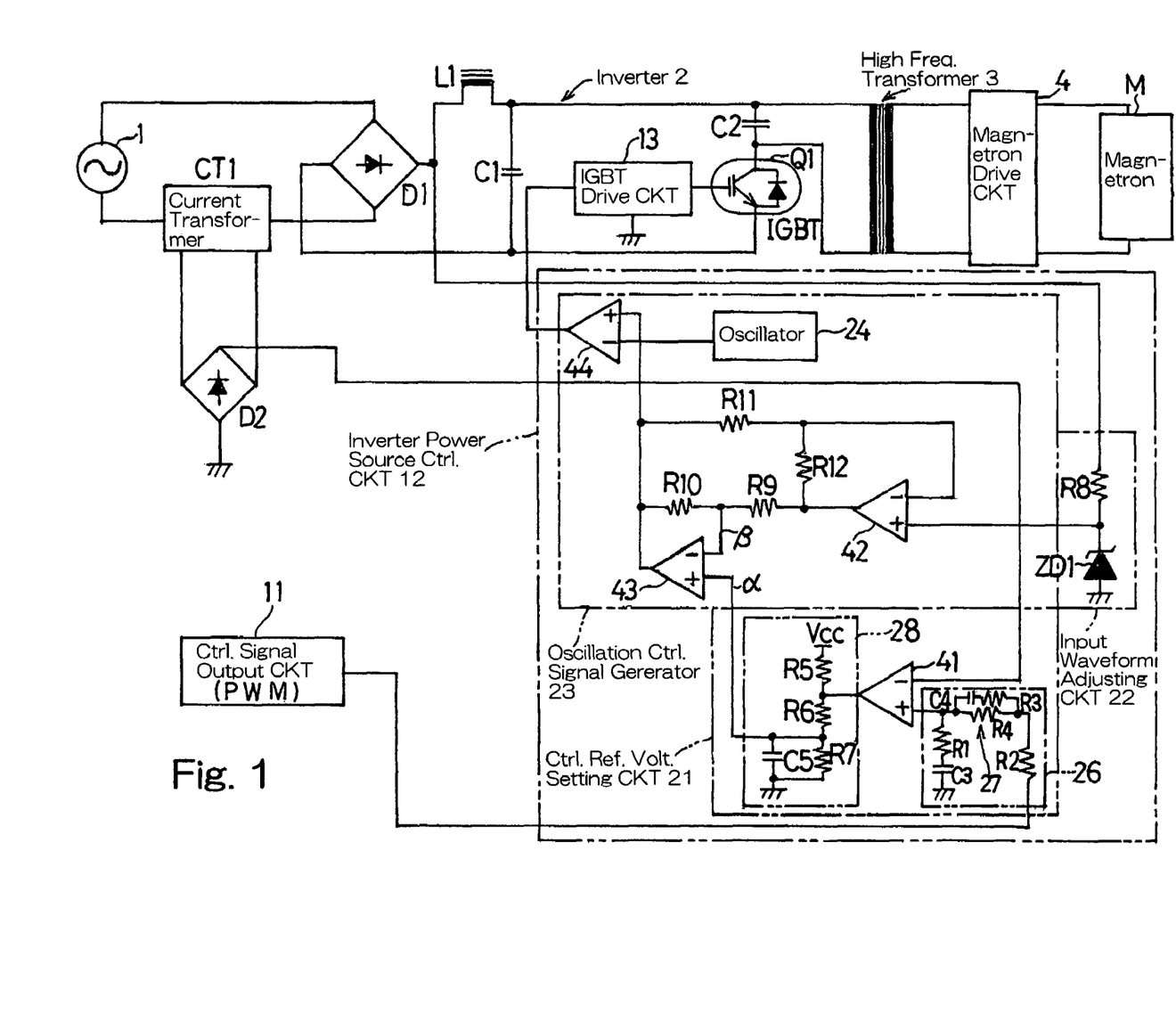
FIG. 1 is a circuit block diagram showing an inverter power source circuit system including an inverter power source control circuit for a microwave oven according to a preferred embodiment of the present invention.

FIG. 1 illustrates a circuit block diagram of an inverter power source circuit including an inverter power source control circuit 12 for a high frequency heating apparatus such as, for example, a microwave oven according to a preferred embodiment of the present invention. The inverter power source circuit includes, for example, an alternating current (AC) power source 1, a converter D1, an inverter 2, a high frequency transformer 3 and a magnetron drive circuit 4. The inverter power source circuit also includes a current transformer CT1 interposed between the AC power source 1 and the converter D1 for detecting an alternating current output from the AC power source 1, which varies in dependence on fluctuation of an output from a magnetron M, in reference to the electric current flowing between the current power source 1 and the converter D1.

The inverter power source circuit of the structure described above is so designed and so operable that an alternating current output from the AC power source 1 can be full-wave rectified by the converter D1 to provide a direct current output, which is in turn converted by the inverter 2 to a desired alternating current output that is used to cause a high frequency current to generate from a primary winding of the high frequency transformer 3 so that a secondary winding of the high frequency transformer 3 can provide an electric power necessary to activate the magnetron M through the magnetron drive circuit 4. At this time, the magnetron drive circuit 4 is electrically connected with the secondary winding of the high frequency transformer 3 to output a rectified electric power of a doubled voltage.

The inverter 2 includes, for example, a control signal output circuit 11 for outputting a PWM control signal fed from a microcomputer used to control the electronic oven, an inverter power source control circuit 12 for generating an oscillation control signal, that is turned on and off, on the basis of the PWM control signal to control an oscillation of the inverter power source circuit, and a switching element such as, for example, an insulated gate bipolar transistor (IGBT) element Q1 operable in response to the oscillation control signal applied to the gate of the IGBT element Q1 through an IGBT drive circuit 13 to generate a high frequency current. A smoothing reactor L1 and parallel connected capacitors C1 and C2 are interposed between the converter D1 and the IGBT element Q1.

The inverter power source control circuit 12 referred to above is operable to generate the oscillation control signal used to approximate the waveform of an electric current of the alternating current output from the AC power source 1 to a sinusoidal wave in correspondence with the fluctuation of the PWM control signal to thereby improve the power factor of the power source circuit and includes a control reference voltage setting circuit 21, an input waveform adjusting circuit 22 and an oscillation control signal generating circuit 23.

The control reference voltage setting circuit 21 is operable to output a reference voltage setting signal $\alpha$, that is used as a benchmark for the generation of the oscillation control signal. The reference voltage setting signal $\alpha$ has a voltage set by the control reference voltage setting circuit 21 in correspondence with the PWM control signal. Accordingly, with the oscillation control signal having the voltage so set in the manner described above, an electric current can be induced in those areas appearing on both sides of the waveform, where no current flow because of the characteristic of the magnetron as hereinbefore discussed, to thereby render the waveform of the current of the alternating current output to be approximated to the sinusoidal wave.

As shown in FIG. 1, the control reference voltage setting circuit 21 includes, for example, an integrating circuit 26 for smoothing the PWM control signal fed from the control signal output circuit 11. This integrating circuit 26 includes a series connected circuit made up of a resistor R1 and a capacitor C3, and a resistor R2 connected parallel with the series connected circuit of the resistor R1 and the capacitor C3 and, also, includes an integrating circuit (not shown), similar to the integrating circuit 26, for smoothing a detected and rectified signal, which corresponds to a detected current from the current transformer CT1 having been rectified. In consideration of the soft start, those integrating circuit have a relatively large time constant. The integrating circuit for smoothing the PWM control signal is provided with a ripple generating circuit 27 for generating a ripple in the PWM control signal. This ripple generating circuit 27 includes, for example, a series connected circuit, made up of a capacitor C4 and a resistor R3, and a resistor R4 that is connected in parallel to the series connected circuit of the capacitor C4 and the resistor R3. It is to be noted that although in the illustrated instance, the ripple is generated in the PWM control signal, it may be generated in either of the PWM control signal and the detected and rectified signal and that the ripple generating circuit may be provided in the integrating circuit for smoothing the detected and rectified signal fed from the current transformer CT1 so that the ripple can be generated in the detected and rectified signal.

The control reference voltage setting circuit 21 also includes a first voltage comparator (a first OP amplifier) 41 for receiving and comparing the PWM control signal, having the ripple formed therein, and the detected and rectified signal with each other, and an integrating circuit 28 for smoothing an output from the first OP amplifier 41. The integrating circuit 28 outputs the reference voltage setting signal $\alpha$ for generating the oscillation control signal. This integrating circuit 28 includes series connected voltage dividing resistors R6 and R7, which are connected in series between Vcc and the ground through a resistor R5, and a capacitor C5 connected at one end with the junction between the voltage dividing resistors R6 and R7 and at the other end with the ground and also connected in parallel to the resistor R7 and has a relatively small time constant in consideration of the responsivity.

With the ripple formed in the PWM control signal, a signal of a high frequency can be stably outputted from the first OP amplifier 41, that is, comparison of the alternating current outputs is carried out by the first OP amplifier 41 at a short cycle and, therefore, the frequency of the comparison is so high that the responsivity with the fluctuation of the magnetron output and the stability can be increased. The output from the first OP amplifier 41, when smoothed by the integrating circuit 28, stabilizes, selection of a relatively small time constant of the integrating circuit 28 is effective to maintain the responsivity, and the responsivity and stability in correspondence with the fluctuation of the magnetron output can further be increased. Further, the responsivity can be increased as a result of the generation of the ripple in the integrating circuit 26, and the soft start can be realized since the integrating circuit 26 has a large time constant.

The input waveform adjusting circuit 22 referred to previously is operable to adjust a peak portion of the waveform of an input to the inverter 2, for example, a peak portion of the waveform of a full wave rectified output fed to the inverter 2 to a sinusoidal wave so that a peak adjustment signal $\beta$ used to generate the oscillation control signal can be generated. With the oscillation control signal including the peak adjustment signal $\beta$, the current waveform of the alternating current output can be approximated to the sinusoidal wave by subtracting the peak adjustment signal β of a sinusoidal waveform from a peak portion of the current waveform of the alternating current output.

As shown in FIG. 1, the input waveform adjusting circuit 22 includes, for example, a resistor R8 of a high resistance, for example, a few tens kΩ, and a Zener diode ZD1 connected in series with the resistor R8. With this resistor R8 and the Zener diode ZD1, a voltage, which is divided from the full wave rectified output is cut (top clipped) by the Zener diode ZD1 to a predetermined voltage consistent with the characteristic of the magnetron and, at the same time, by the utilization of the characteristic of the Zener diode ZD1, in which when the flowing electric current is reduced across the resistor R8 of a high resistance a voltage exceeding the predetermined voltage is generated, a voltage portion in the vicinity of the voltage so cut out by the Zener diode ZD1 is approximated to the sinusoidal wave. With the peak adjusted signal based thereon, the current waveform of the alternating current output can be approximated to the sinusoidal wave. Accordingly, with the use of a simple combination of the resistor R8 of a high resistance and the Zener diode ZD1, the input waveform adjusting circuit 22 can be realized at a reduced cost.

The oscillation control signal generating circuit 23 is operable to generate an oscillation control signal based on a waveform shaping signal, made up of the reference voltage setting signal α and the peak adjustment signal β, and a triangular wave signal fed from an oscillator 24. With the oscillation control signal containing the reference voltage setting signal α and the peak adjustment signal β, the power factor of the electric power source circuit can be increased by approximating the current waveform of the alternating current output from the AC power source 1 to the sinusoidal wave in correspondence with fluctuation of the PWM control signal.

As shown in FIG. 1, the oscillation control signal generating circuit 23 includes, for example, a second voltage comparator (a second OP amplifier) 42 forming a differential amplifier, and a third voltage comparator (a third OP amplifier) 43. The second OP amplifier 42 is operable to receive a signal corresponding to the full wave rectified output, of which waveform has been adjusted by the input waveform adjusting circuit 22, and an output from the third OP amplifier 43 and then to generate the peak adjustment signal β and, on the other hand, the third OP amplifier 43 is operable to receive the reference voltage setting signal α from the control reference voltage setting circuit 21 and the peak adjustment signal β from the second amplifier 42 and then to output a waveform shaping signal made up of the reference voltage setting signal α and the peak adjustment signal β for generating the oscillation control signal.

The second OP amplifier 42 having a positive phase (+) input terminal, a reverse phase (−) input terminal and an output terminal is electrically connected at the positive phase input terminal thereof with a junction between the resistor R8 and the Zener diode ZD1 of the input waveform adjusting circuit 22. The third OP amplifier 43 similarly having a positive phase (+) input terminal, a reverse phase (−) input terminal and an output terminal is electrically connected at the positive phase input terminal thereof with an output of the integrating circuit 28. The third amplifier 43 is also electrically connected at the reverse phase input terminal thereof with a junction between the resistors R9 and R10 and at the output terminal with the reverse phase input terminal of the second OP amplifier 42 through a resistor R11. The output terminal of the second amplifier 42 is electrically connected with the reverse phase input terminal thereof through a resistor R12.

The oscillation control signal generating circuit 23 also includes a fourth voltage comparator (a fourth OP amplifier) 44 having a reverse input terminal, to which a triangular wave signal is fed from the oscillator 24, which may be in the form of, for example, a synchronous triangular wave oscillator, and also having a positive phase input terminal to which a signal comprised of the peak adjustment signal β and the reference voltage setting signal α from the oscillation control signal generating circuit 23 is applied. This fourth OP amplifier 44 outputs the oscillation control signal to the gate of the IGBT element Q1 through the IGBT drive circuit 13.

Figure 2A:
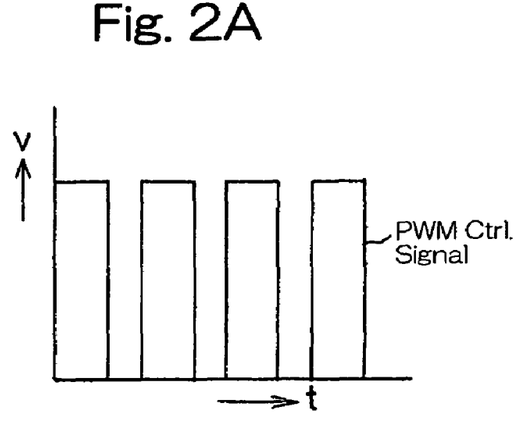
FIG. 2A is a chart showing an operating waveform of a control reference voltage setting circuit shown in FIG. 1.
Figure 2B:
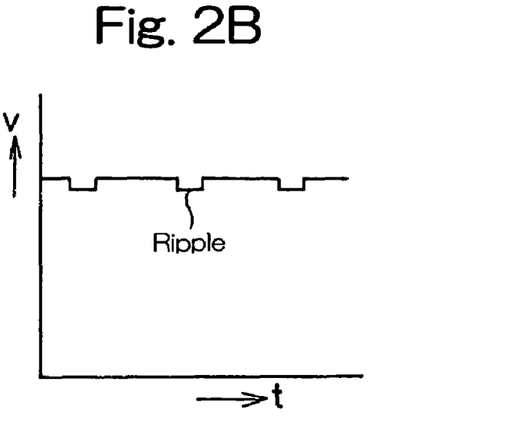
FIG. 2B is a chart showing another operating waveform of the control reference voltage setting circuit shown in FIG. 1.
Figure 2C:
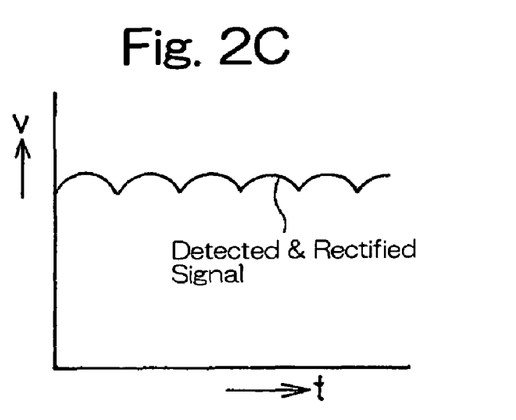
FIG. 2C is a chart showing a different operating waveform of the control reference voltage setting circuit shown in FIG. 1.
Figure 2D:
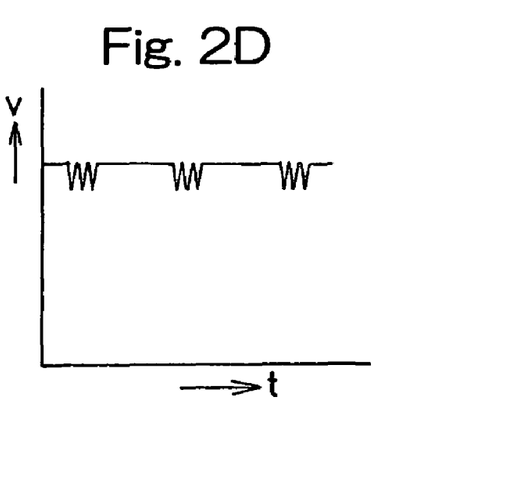
FIG. 2D is a chart showing a further operating waveform of the control reference voltage setting circuit shown in FIG. 1.

The operation of the inverter power source control circuit 12 of the circuit design hereinabove described will now be described with particular reference to FIGS. 2 to 6. FIG. 2 illustrates the operation of the control reference voltage setting circuit 21. The PWM control signal of a square wave as shown in FIG. 2A is supplied to the integrating circuit 26 including the ripple generating circuit 27, where the PWM control signal is smoothed to a predetermined state, accompanied by ripples as shown in FIG. 2B. On the other hand, the detected and rectified signal from the current transformer CT1, which changes in correspondence with change of the magnetron output is also smoothed by the integrating circuit as shown in FIG. 2C. When both of those signals are inputted to the first OP amplifier 41, a high frequency signal is stably outputted from the first OP amplifier 41 as shown in FIG. 2D. In this way, the first OP amplifier 41 stably outputs the high frequency signal based on the formation of the ripples and since it compares at a short cycle the fluctuation of the alternating current output signal, the responsivity and stability with respect to the fluctuation of the magnetron output can be increased.

Figure 2E:
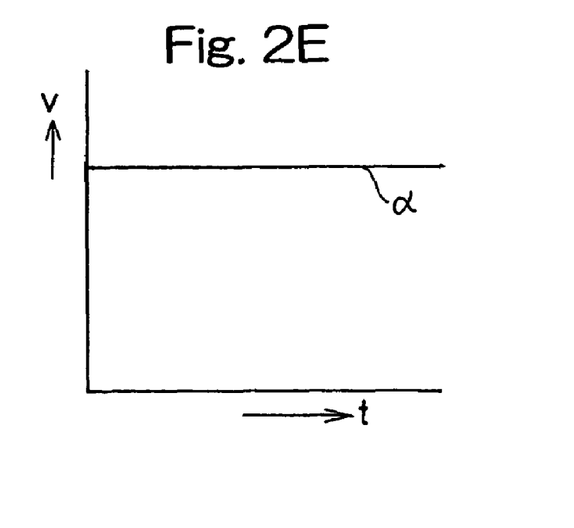
FIG. 2E is a chart showing a still further operating waveform of the control reference voltage setting circuit shown in FIG. 1.

The output shown in FIG. 2D is smoothed and stabilized by the integrating circuit 28 and the reference voltage setting signal α such as shown in FIG. 2E can be obtained. Since the integrating circuit 28 has a relatively small time constant, and in a condition in which the responsivity is maintained, this reference voltage setting signal α can have a high voltage when the output power is high due to the PWM control signal, but can have a low voltage when the output power is low due to the PWM control signal.

Figure 3A:
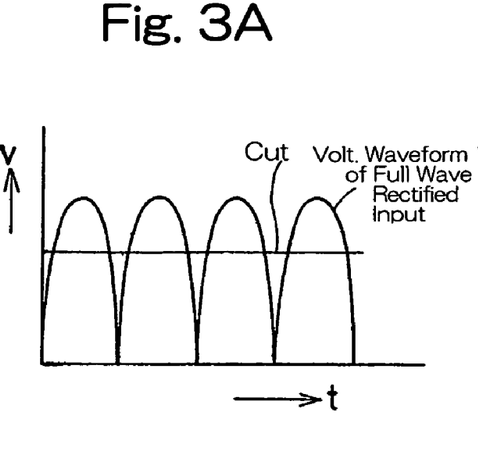
FIG. 3A is a chart showing an operating waveform of an input waveform adjusting circuit shown in FIG. 1.
Figure 3B:
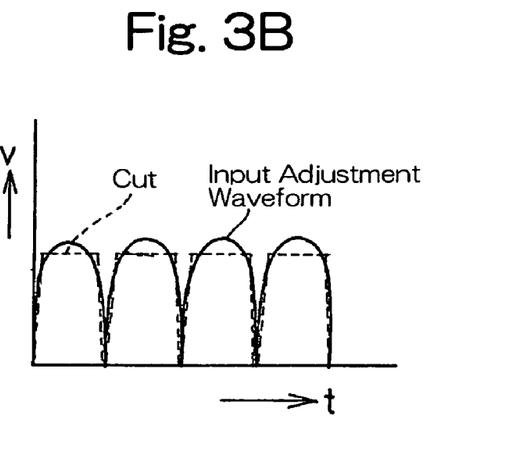
FIG. 3B is a chart showing another operating waveform of the input waveform adjusting circuit shown in FIG. 1.

FIG. 3 illustrates the operation of the input waveform adjusting circuit 22, in which FIG. 3A shows the voltage waveform of the full wave rectified output and FIG. 3B shows the voltage waveform thereof adjusted by the input waveform adjusting circuit 22. The voltage waveform of the full wave rectified output shown in FIG. 3A is cut to a predetermined voltage (top clipped) by the Zener diode ZD1 consistent with the characteristic of the magnetron and, at the same time, by the utilization of the characteristic of the Zener diode ZD1, in which when the electric current is reduced across the resistor R8 of a high resistance a voltage exceeding the predetermined voltage is generated, a voltage portion in the vicinity of the voltage so cut out by the Zener diode ZD1 is approximated to the sinusoidal wave.

Figure 4A:
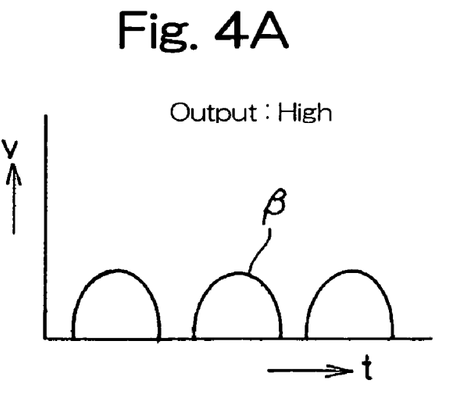
FIG. 4A is a chart showing an operating waveform of an oscillation control signal generating circuit shown in FIG. 1.
Figure 4B:
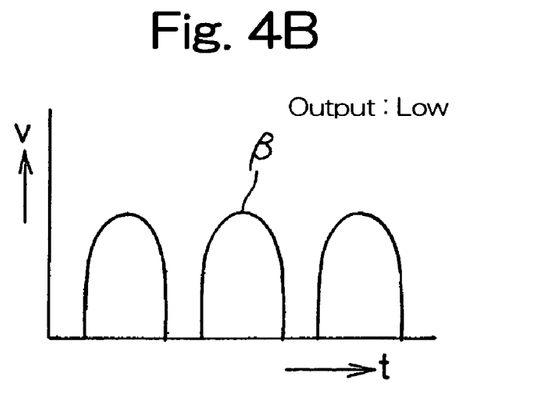
FIG. 4B is a chart showing another operating waveform of the oscillation control signal generating circuit shown in FIG. 1.
Figure 4C:
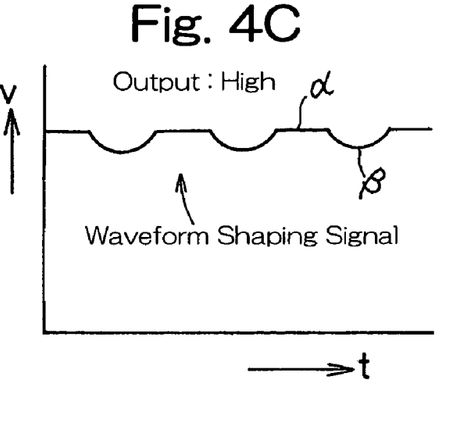
FIG. 4C is a chart showing a further operating waveform of the oscillation control signal generating circuit shown in FIG. 1.
Figure 4D:
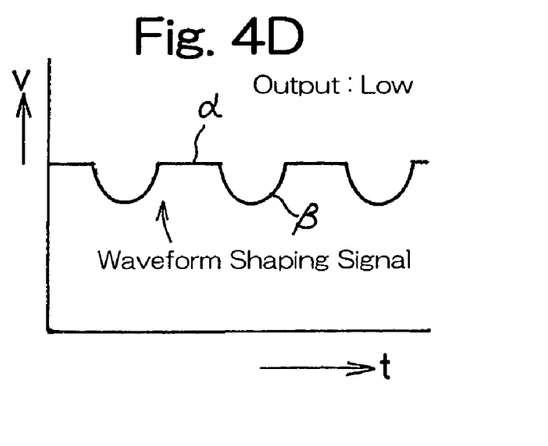
FIG. 4D is a chart showing a still further operating waveform of the oscillation control signal generating circuit shown in FIG. 1.

FIGS. 4 and 5 illustrate the operation of the oscillation control signal generating circuit 23, in which FIGS. 4A and 4B show the output from the second OP amplifier 42. As shown therein, the oscillation control signal generating circuit 23 outputs an waveform corresponding to the signal, of which voltage waveform of the full wave rectified output adjusted, and subsequently subtracted from the reference setting voltage signal α. Particularly, FIG. 4A illustrates the peak adjustment signal β having low peaks when the output power is high due to the PWM control signal, and FIG. 4B illustrates the peak adjustment signal β having high peaks when the output power is low due to the PWM control signal. FIGS. 4C and 4D show the output from the third OP amplifier 43. In particular, FIG. 4C illustrates generation of the waveform shaping signal having shallow dales brought about by an increase of the voltage of the reference setting voltage signal α when the output power is high due to the PWM control signal, whereas FIG. 4D illustrates generation of the waveform shaping signal having deep dales brought about by a decrease of the voltage of the reference setting voltage signal α when the output power is low due to the PWM control signal. Because of the fact that those waveform shaping signals can be obtained one at a time, the oscillation control signal based on this waveform shaping signal can represents a signal having a large range of controllability and, hence, easily controllable and effective in shaping the current waveform of the alternating current output from the AC power source 1 to the sinusoidal wave.

Figure 5A:
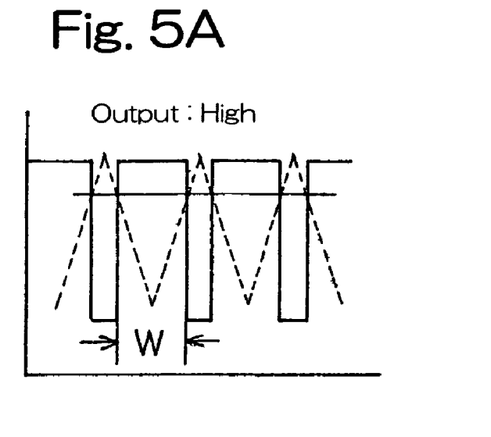
FIG. 5A is a chart showing an operating waveform of an oscillation control signal generating circuit shown in FIG. 1.
Figure 5B:
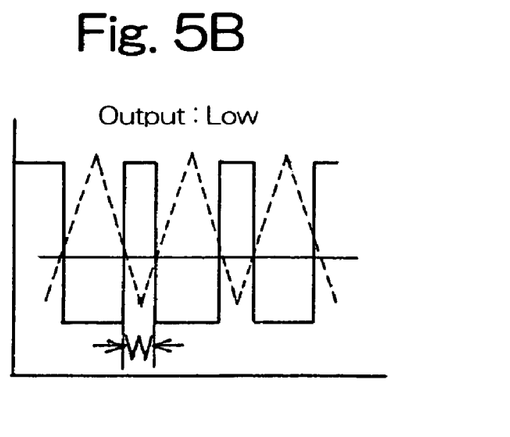
FIG. 5B is a chart showing another operating waveform of the oscillation control signal generating circuit shown in FIG. 1.

FIGS. 5A and 5B illustrates the pulse width obtained from the triangular wave signal, inputted to the fourth OP amplifier 44 and the voltage of the reference voltage setting signal α. Based on the width of the square wave of the PWM control signal, this pulse width W increases when the voltage of the reference voltage setting signal α is high, but decreases when the voltage of the reference voltage setting signal α is low.

Figure 5C:
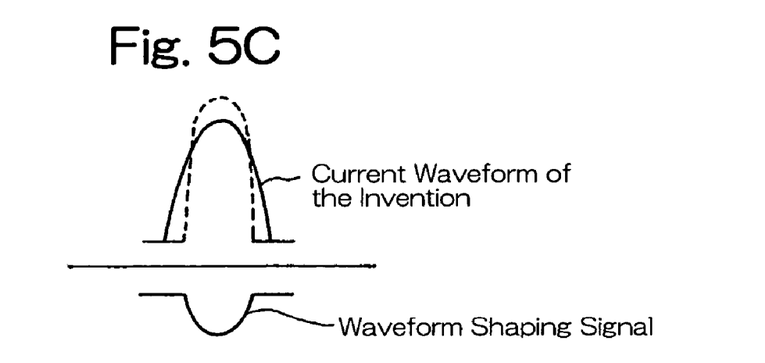
FIG. 5C is a chart showing a further operating waveform of the oscillation control signal generating circuit shown in FIG. 1.

FIG. 5C illustrates the manner in which the current waveform of the alternating current output from the AC power source 1 is shaped by the control oscillation signal, so formed in the manner described above, to represent the sinusoidal wave. By the effect of the reference voltage setting signal α contained in the oscillation control signal, when the voltage thereof increases, current is induced in the rise (ascent) and descent area appearing on both sides of the current waveform of the alternating current output from the AC power source 1 in correspondence with the fluctuation of the PWM control signal, wherefore the current waveform of the alternating output from the AC power source 1 is approximated to the sinusoidal wave and is approximated to the sinusoidal wave by subtracting a peak portion of the current waveform from the peak adjusting signal β of a sinusoidal wave.

Figure 6A:
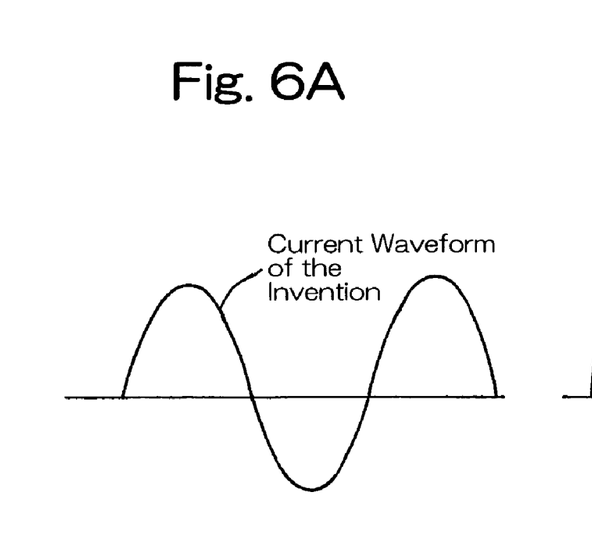
FIG. 6A is a chart showing a current waveform of an alternating current output from an alternating current power source shown in FIG. 1.
Figure 6B:
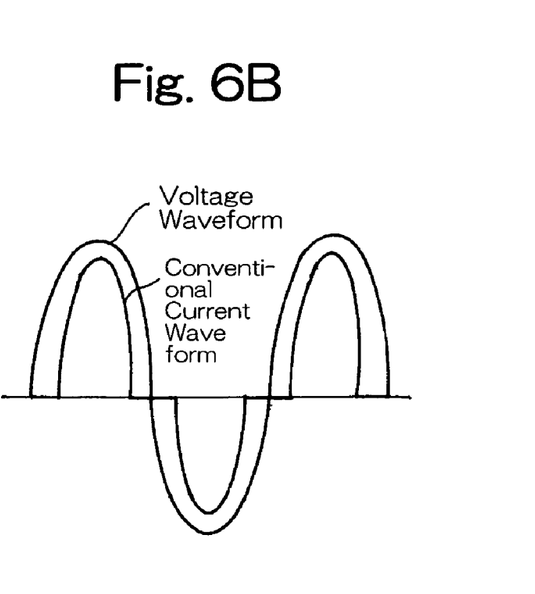
FIG. 6B is a chart showing the conventional waveform of the alternating current output from the alternating current power source.

Accordingly, as shown in FIG. 6A, the current waveform of the alternating current output from the AC power source 1 approximates to the sinusoidal wave in correspondence with the fluctuation of the PWM control signal and, therefore, the power factor of the inverter power source circuit employed in the microwave oven can be automatically increased to thereby increase the efficiency of the power source.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in the foregoing embodiment the switching element has been shown and described as employed in the form of the IGBT (Gate Insulated Bipolar Transistor) element, it may be in the form of any other suitable element provided that the latter can be employed to control the oscillation of the inverter power source control circuit for the microwave oven.

Accordingly, such changes and modifications are, unless they depart from the scope of the present invention as delivered from the claims annexed hereto, to be construed as included therein.

What is claimed is:

1. An inverter power source control circuit for a high frequency heating apparatus, which is provided in an inverter power source circuit for supplying an electric power to a magnetron of the high frequency heating apparatus and operable to generate an oscillation control signal by full wave rectifying and converting an alternating current output from an alternating current power source to a direct current output and applying the oscillation control signal, based on a PWM control signal through an inverter to a switching element to thereby convert the direct current output to a desired alternating current output, which circuit comprises;

a control reference voltage setting circuit for outputting a reference voltage setting signal useable as a benchmark for generation of the oscillation control signal of a voltage set in correspondence with fluctuation of the PWM control signal, wherein by means of the oscillation control signal having the voltage so set, a current waveform of the alternating current output can be approximated to a sinusoidal wave by generating an electric current at both sides of the current waveform of the alternating current output;

an input waveform adjusting circuit for adjusting a peak portion of an input waveform, applied to the inverter to generate a peak adjustment signal required to generate the oscillation control signal, to a sinusoidal wave, wherein by means of the oscillation control signal having this peak adjustment signal, the current waveform of the alternating current output can be approximated to the sinusoidal wave through subtraction of the peak portion of the waveform using the peak adjustment signal of the sinusoidal wave; and an oscillation control signal generating circuit for generating the oscillation control signal based on a waveform shaping signal, comprised of the reference voltage setting signal and the peak adjustment signal, and a triangular wave signal from an oscillator, wherein by means of the oscillation control signal containing the reference voltage setting signal and the peak adjustment signal, even though the PWM control signal fluctuates, the current waveform of the alternating current output from the alternating current power source can be approximated to a sinusoidal wave to thereby improve a power factor of an electric power source circuit.

2. The inverter power source control circuit for a high frequency heating apparatus as claimed in claim 1, wherein the control reference voltage setting circuit includes a ripple generating circuit for generating a ripple in one of the PWM control signal or a detected and rectified signal, which is a detected signal outputted from a current transformer for detecting the alternating current output from the alternating current power source, a first voltage comparator for comparing the PWM control signal and the detected and rectified signal, either of which contains the ripple, with each other when the both are applied thereto, and an integrating circuit having a small time constant for smoothing an output from the first voltage comparator.

3. The inverter power source control circuit for a high frequency heating apparatus as claimed in claim 2, further comprising an integrating circuit having a large time constant for smoothing the PWM control signal or an output of the detected and rectified signal, respectively, and wherein the ripple generating circuit is provided in either one of those integrating circuits.

4. The inverter power source control circuit for a high frequency heating apparatus as claimed in claim 1, wherein the input waveform adjusting circuit includes a resistor having a high resistance and a Zener diode connected in series with the resistor, wherein by utilization of a characteristic of the Zener diode when the electric current is lowered with the resistor having the high resistance, an input waveform of the full wave rectified output to be applied to the inverter is adjusted.

5. The inverter power source control circuit for a high frequency heating apparatus as claimed in claim 1, wherein the oscillation control generating circuit includes a second voltage comparator and a third voltage comparator, each forming a differential amplifier, wherein when a signal having the adjusted input waveform from the inverter and an output from the third voltage comparator are fed to the second voltage comparator, the second voltage comparator outputs the peak adjustment signal and, also, when the reference voltage setting signal from the control reference voltage setting circuit and the peak adjustment signal from the second voltage comparator are fed to the third voltage comparator, the third voltage comparator outputs the waveform shaping signal comprised of the reference voltage setting signal and the peak adjustment signal.

6. The inverter power source control circuit for a high frequency heating apparatus as claimed in claim 1, wherein the high frequency heating apparatus is a microwave oven.

7. The inverter power source control circuit for a high frequency heating apparatus as claimed in claim 1, wherein the switching element comprises an insulated gate bipolar transistor element.

* * * * *